United States Patent [19]

Neuhring

[11] 4,267,687
[45] May 19, 1981

[54] COMBINATION COMBINE AND HAY HEAD

[76] Inventor: Harley D. Neuhring, R.R. #1, Kanawha, Iowa 50447

[21] Appl. No.: 86,412

[22] Filed: Oct. 19, 1979

[51] Int. Cl.³ .............................................. A01D 73/00
[52] U.S. Cl. ................................ 56/14.4; 56/DIG. 9; 56/2
[58] Field of Search ...................... 56/DIG. 9, 2, 14.4

[56] References Cited

U.S. PATENT DOCUMENTS

| | | | |
|---|---|---|---|
| 3,324,637 | 6/1967 | Ashton et al. | 56/2 |
| 3,425,194 | 2/1969 | Stott et al. | 56/2 |
| 3,599,402 | 8/1971 | Heising et al. | 56/DIG. 9 |
| 3,638,407 | 2/1972 | Togami | 56/DIG. 9 |
| 4,202,154 | 5/1980 | Waldrop et al. | 56/2 |

Primary Examiner—Robert A. Hafer
Attorney, Agent, or Firm—Zarley, McKee, Thomte, Voorhees & Sease

[57] ABSTRACT

An adapter frame for mounting a hay head of a forage harvester to a grain combine comprising an upper frame member for attachment to the upper combine frame, a lower frame member for attachment to the lower combine frame, vertical frame members interconnecting the upper and lower frame members, and horizontal attachment rods secured to the respective upper and lower frame members for reception into clevis members on a forage harvester, a threshold member on the lower frame member to bridge the output opening of the forage harvester with the input opening on the combine frame, and a hydraulic operating motor on the forage harvester connected to the hydraulic circuit of the combine.

7 Claims, 6 Drawing Figures

COMBINATION COMBINE AND HAY HEAD

BACKGROUND OF THE INVENTION

A forage harvester is a device that is normally pulled behind a tractor and is adapted to pick up cut forage from windrows, chop the picked up forage, and blow the chopped forage into a forage wagon for ultimate deposit in a silo.

Grain combines are adapted to cut and receive growing grain plants and to separate the grain from the plant. The grain tables of combines are normally wide and heavy devices and are much larger than the forage pick-up devices on a forage harvester. Heretofore, it has not been possible to use the relatively small forage pick up device from a forage harvester on a grain combine.

SUMMARY OF THE INVENTION

The present invention provides an adapter frame whereby the pick-up head from a forage harvester can be placed on the forward end of a grain combine. Thus, when oats have been cut and placed in windrows, the present invention permits the pick-up head of a forage harvester to be placed on the forward end of a combine in place of the usual grain table, and the pick-up head can pick up the windrow oats and deliver them to the combine for the conventional threshing operation whereby the oats are separated from the plant. The adapter frame of this invention includes an upper frame member for attachment to the upper combine frame and a lower frame member for attaching to the lower combine frame. Vertical frame members interconnect the upper and lower frames, and define a forage passageway in the center portion of the adapter frame. A threshold member on the lower frame member serves to bridge the distance between the output opening of the forage pick-up head with the input opening of the combine. A hydraulic motor on the pick-up head is connected to the hydraulic circuit of the combine.

DESCRIPTION OF THE PREFERRED EMBODIMENT

Figure 1:
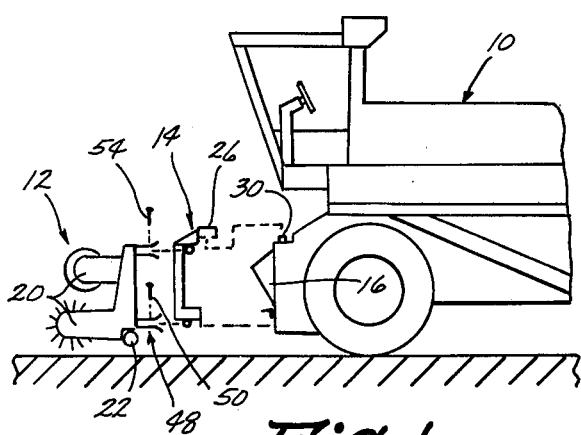
FIG. 1 is an exploded side elevational view of the combine, hay pick-up head, and adapter frame.
Figure 2:
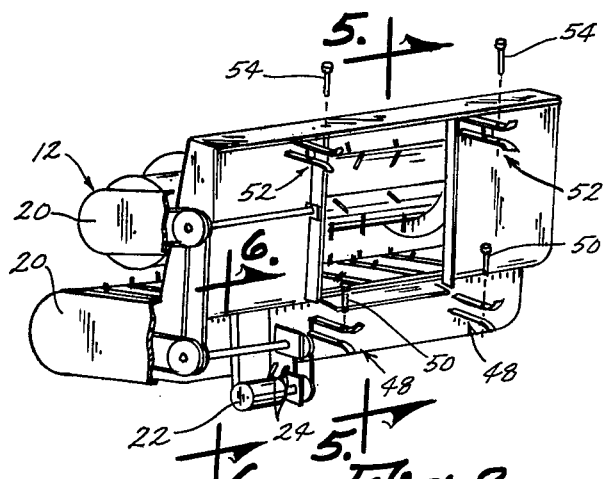
FIG. 2 is a rearward perspective view in larger scale of the forage pick up head.
Figure 3:
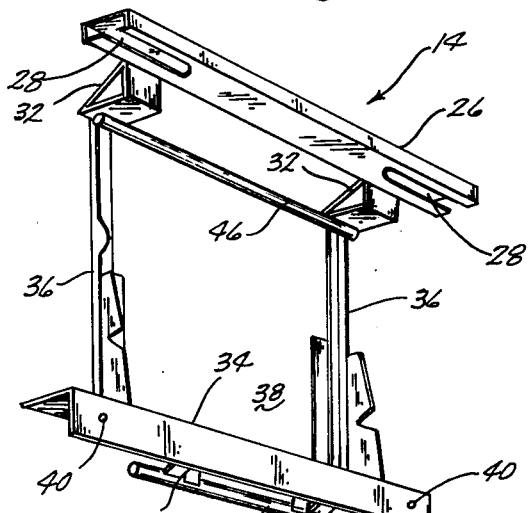
FIG. 3 is a rearward perspective view at an enlarged scale of the adapter frame.
Figure 4:
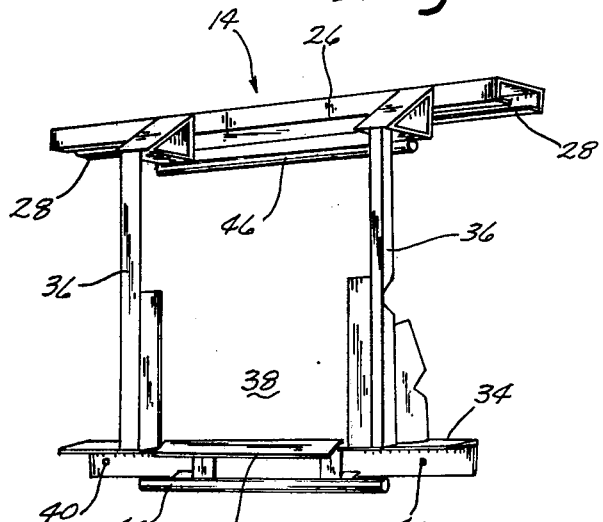
FIG. 4 is a forward perspective view of the adapter frame.
Figure 6:
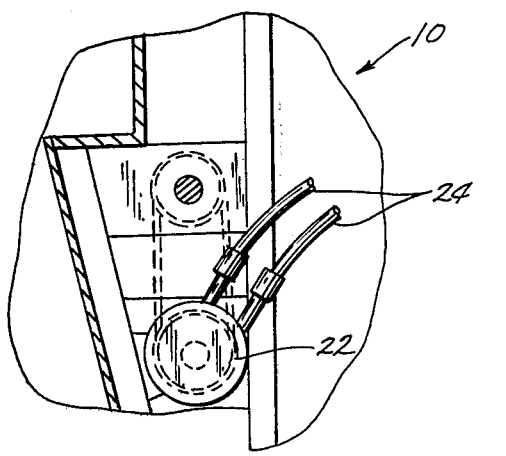
FIG. 6 is a sectional view taken on line 6—6 of FIG. 2.

FIG. 1 shows a conventional grain combine 10, a conventional hay pick-up 12, and the adapter frame 14 of this invention. The forward end 16 of the combine has a conventional intake opening 18. The hay or forage pick-up 12 utilizes a conventional rotary pick-up means 20. The conventional pick-up 20 normally does not have a motor thereon, and this invention provides for a hydraulic motor 22 mounted on the supporting frame of the hay pick-up device. As shown in FIG. 6, the hydraulic motor 22 is connected to the hydraulic circuit 24 of the combine.

The adapter frame 14 includes an upper frame member 26, which includes slots 28. Slots 28 are adapted to be received on conventional hubs 30 on the forward end of the combine. Brackets 32 extend forwardly from the upper frame member 26 and are secured to lower frame member 34 by vertical frame members 36. The upper and lower frame members and the vertical frame members define a forage passageway 38. Holes 40 in the lower frame member 34 are adapted to receive bolts to secure the lower frame member to the forward end of the combine. Brackets 42 are secured to the lower frame member and are adapted to support the horizontally disposed lower attachment rod 44. Upper attachment rod 46 is secured to the lower side of bracket 32.

Figure 5:
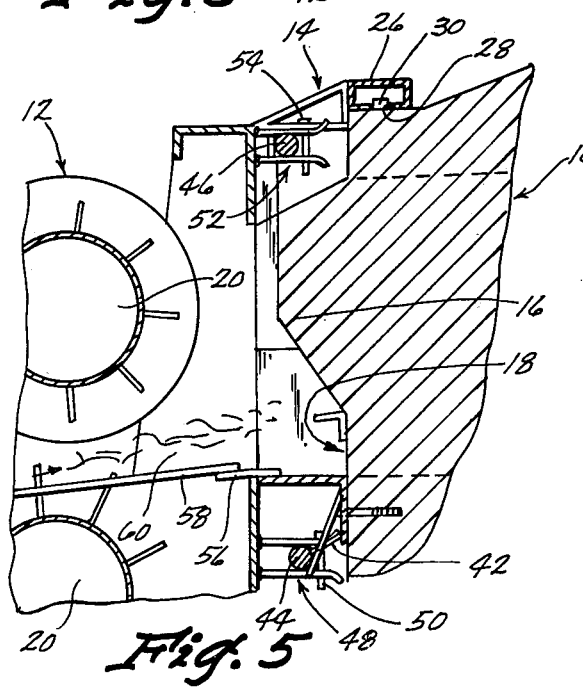
FIG. 5 is a sectional view taken on line 5—5 of FIG. 2 showing the hay head mounted on the adapter frame which in turn is mounted on the forward end of the combine.

As seen in FIG. 5, conventional lower clevis elements 48 on the hay head 12 are adapted to embrace the lower attachment rod 44 and are secured thereto by conventional pins 50 which pass through the lower clevis element. Similarly, upper clevis elements 52 secured to the hay pick-up 12 embrace the upper attachment rod 46 and are secured thereto by bolts or pins 54.

A forwardly extending plate or threshold 56 is secured to the lower frame member 34. Threshold 36 acts in conjunction with the lower frame member to bridge the distance between the lower deck 58 of the hay pick-up head 12 and the intake opening of the combine. Thus, forage can be easily delivered from the discharge opening 60 of the hay pick-up head to the intake opening 18 of the combine.

The relatively narrow and compact dimensions of the adapter frame 14 permit the hay pick-up head 12 to be closely nestled to the forward end of the combine 10, thus facilitating the transfer of the picked up forage into the combine. After the hay pick-up head 12 has been secured to the forward end of the combine as described, the hydraulic motor 22 on the hay pick-up head can be easily connected to the hydraulic circuitry 24 of the combine so that the combine can thereby power the hay pick-up head.

This invention permits the relatively small hay pick-up head of a forage harvester to be easily adapted to a new machine, i.e., the grain combine, to permit such crops as windrowed oats and the like to be quickly and easily picked up and transferred to the combine.

Thus, it can be seen that the device accomplishes at least all of its stated objectives.

What is claimed is:

1. The combination of a grain combine having a forward end, an intake opening, and a hydraulic circuit, and a forage harvester rotatable forage pick-up means having a discharge opening and a plurality of clevis attachment elements, comprising, an adapter frame having an upper horizontally disposed frame member having a pair of spaced apart slots adapted to receive the conventional hubs on the upper forward end of a combine a lower horizontally disposed frame member having a plurality of holes adapted to receive bolts to be secured to the lower forward end of a combine, spaced apart vertical frame members connecting said upper and lower frame members and defining a forage passageway opening adapted to register with the discharge opening of a forage harvester forage pick-up means, and with the intake opening on a combine, horizontally disposed attachment rods on said upper and lower frame members for attachment to clevis elements on a forage harvester, said adapter frame having a center opening registering with the intake opening on said combine and said discharge opening on said forage pick-up means.

2. The combination of claim 1 wherein a hydraulic motor is mounted on said forage harvester and is operatively connected to the forage pickup means thereof, said hydraulic motor being operatively secured to the hydraulic circuit of said combine.

3. The combination of claim 1 wherein said adapter frame includes a threshold means bridging the discharge opening of said forage pick-up mens and the intake opening of said combine.

4. The combination of claim 1 wherein said adapter frame has upper and lower attachment rods in operative attachment with said clevis attachment elements.

5. An adapter frame for mounting a forage harvester forage pick-up means on a grain combine, comprising, an upper horizontally disposed frame member having a pair of spaced apart slots adapted to receive the conventional hubs on the upper forward end of a combine a lower horizontally disposed frame member having a plurality of holes adapted to receive bolts to be secured to the lower forward end of a combine, spaced apart vertical frame members connecting said upper and lower frame members and defining a forage passageway opening adapted to register with the discharge opening of a forage harvester forage pick-up means, and with the intake opening on a combine, and horizontally disposed attachment rods on said upper and lower frame members for attachment to clevis elements on a forage harvester.

6. The device of claim 5 wherein a threshold member is secured to and extends forwardly from said lower frame member.

7. The device of claim 5 wherein a hydraulic motor is mounted on said forage harvester and is operatively connected to the forage pick-up means thereof, said hydraulic motor being operatively secured to the hydraulic circuit of said combine.

* * * * *